United States Patent
Muryoi

[15] 3,657,989
[45] Apr. 25, 1972

[54] STOP DEVICE FOR A SHIFTABLE OBJECTIVE LENS

[72] Inventor: Takeshi Muryoi, Yokohama-shi, Japan
[73] Assignee: Nippon Kogaku K.K., Tokyo, Japan
[22] Filed: Dec. 16, 1969
[21] Appl. No.: 885,509

[30] Foreign Application Priority Data

Dec. 28, 1968 Japan...................................43/94480

[52] U.S. Cl. .................................................95/64 R, 95/51
[51] Int. Cl. ............................................................G03b 9/02
[58] Field of Search.....................350/147; 95/51, 64

[56] References Cited

UNITED STATES PATENTS

| 897,733 | 9/1908 | Goddard | 95/51 |
| 3,352,220 | 11/1967 | Lang | 95/64 X |
| 3,375,768 | 4/1968 | Klupsch | 95/64 X |
| 3,291,023 | 12/1966 | Starp | 95/64 |
| 3,394,644 | 7/1968 | Ettischer | 95/64 |

*Primary Examiner*—Samuel S. Matthews
*Assistant Examiner*—Michael Harris
*Attorney*—Joseph M. Fitzpatrick, John Thomas Cella, Charles W. Bradley, Charles B. Cannon, Lawrence F. Scinto, Carroll G. Harper, Edwin T. Grimes, William J. Brunet and Robert L. Baechtald

[57] ABSTRACT

A stop device for an objective lens capable of automatically stopping even when the diaphragm blades are shifted along with the shifting operation of the objective lens. When the normal photography is made, the shifting operation knob is set at the position of zero shift so as to rotate the stop ring to set it at a desired stop value. Upon release of the shutter button, the diaphragm blades are set to the desired stop value through the aid of the aperture control ring. When the shift photography is made, the knob is rotated to shift the objective lens and the aperture control ring, etc. in the predetermined shifting direction. The stop-down ring and the aperture control ring is interconnected so as to set the stop ring at a desired stop value for enabling the release of the shutter button.

3 Claims, 3 Drawing Figures

PATENTED APR 25 1972

INVENTOR.

BY

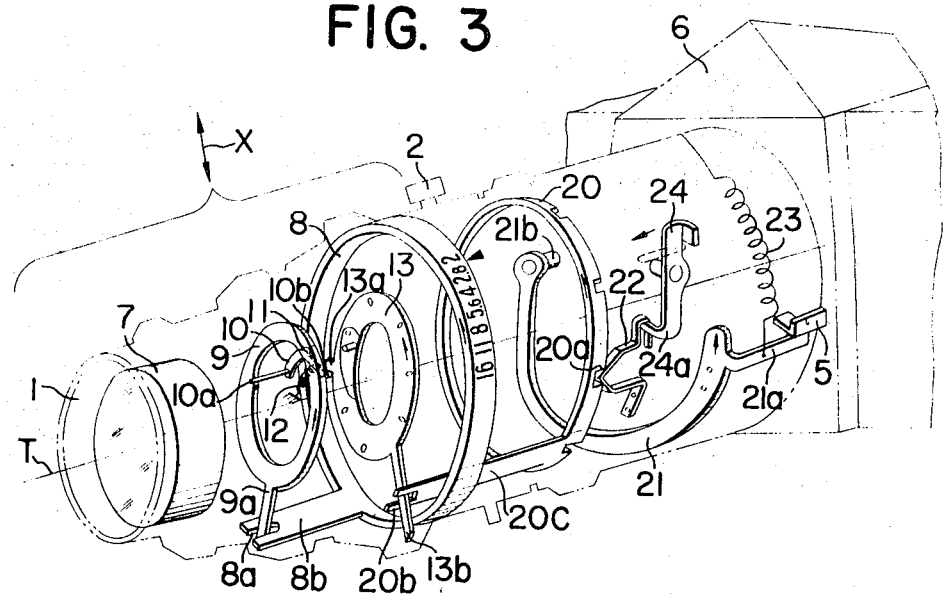

STOP DEVICE FOR A SHIFTABLE OBJECTIVE LENS

This invention relates to an automatic stop device for a shiftable objective lens.

In conventional cameras with shiftable objective lens, it is very difficult to adapt an automatic stop device since the iris blades move with the objective lens when shifting operation is performed.

An object of this invention is to offer a camera with a simple structural shifting device capable of permitting automatic stopping even when the iris blades are shifted.

According to this invention it is possible to measure light intensity through the full opened stop.

The present invention will be described more in detail referring to illustrative embodiments of this invention as shown in the attached drawing, in which:

FIG. 3 is an oblique view of the essential portion of a second embodiment, in which shifting is made in all directions.

Figure 1:
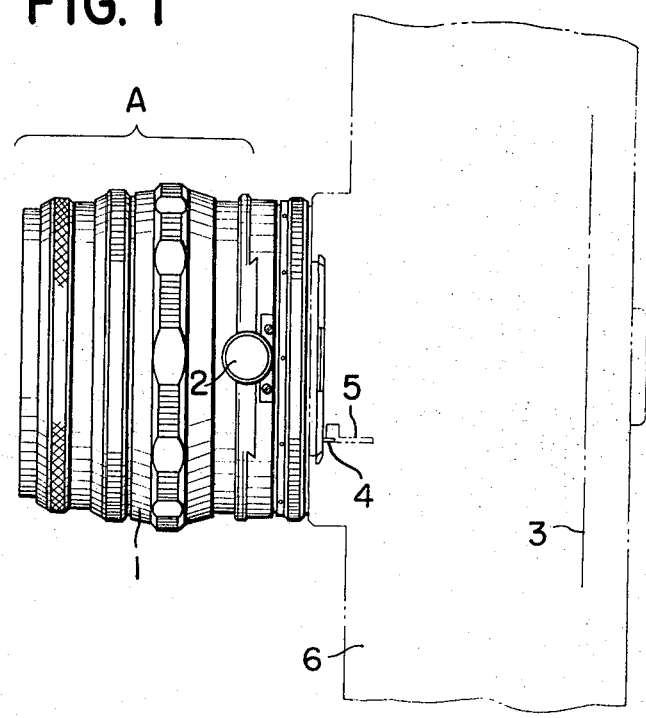
FIG. 1 is a plan view of the outside of a first embodiment of this invention.

In FIG. 1, reference numeral 1 is a lens barrel, and 2 is a shift operation knob which is as constructed that the section A of the lens having a pre-set stop mechanism is shifted upward or downward parallel to the film plane 3 by rotating said knob 2. A linking lever 4c is formed on a blade closing ring 4 which will be described later on. The lever 4c is energized in the blade closing direction and at the same time is locked by a diaphragm interlocking member 5 which is interlocked with a shutter pushbutton not shown in the drawing and is normally located in a position wherein the diaphragm is fully opened.

Reference numeral 6 is a camera body.

Now the first embodiment will be described referring to FIGS. 1 and 2.

Figure 2:
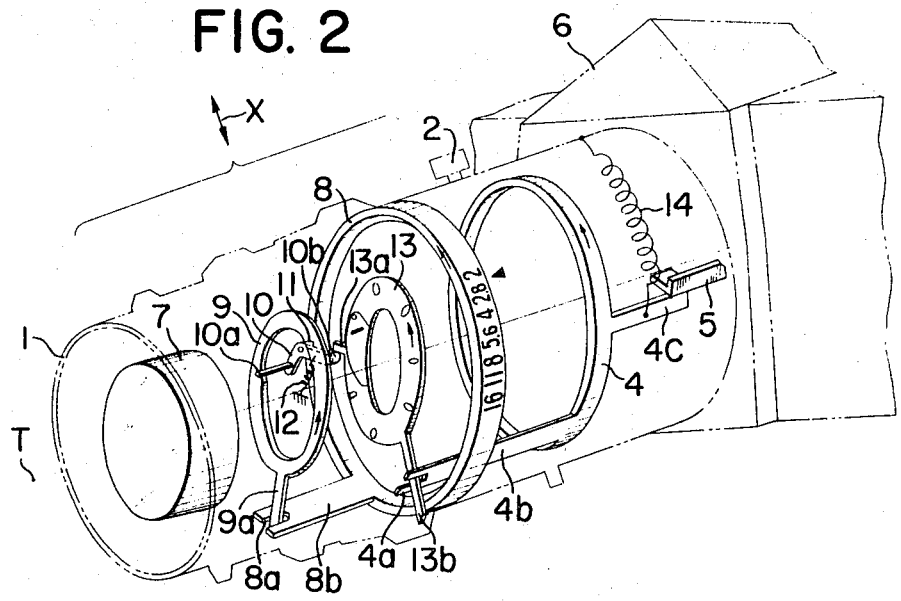
FIG. 2 is an oblique view of the essential portion of the first embodiment, in which shifting is made in one direction.

In FIG. 2, reference numeral 7 is a photo-taking lens, 8 is an aperture setting ring installed on said lens barrel 1 rotatably around an optical axis T. This aperture setting ring 8 forms a connecting part 8b which has a notch 8a that engages a projected portion 9a of a diaphragm cam ring 9 having cam surface in its inner face and mounted on said lens barrel 1 to be rotatable around the optical axis T.

A limiting lever 10 has a contacting rod 10a on its one end which engages the diaphragm cam ring 9 and on its other end a stop pin 10b locking an aperture control ring 13, which will be described later. The middle section of the lever 10 is supported by a shaft 11 fixed on a fixed portion of the lens barrel 1 to be rotatable and is biased by a spring 12 in the clockwise direction. The diaphragm cam ring 9, the limiting lever 10, etc. form the aperture setting part (mechanism) and, when said aperture setting ring 8 is rotated to a desired aperture value, the stop pin 10b of the limiting lever 10 is set to a specified position in response to the aperture setting ring 8 by way of the engagement of the notch 8a of the aperture setting ring 8 and the projected portion 9a, so as to limit the rotation of the aperture control ring 13, to a desired aperture value. The aperture control ring 13 which operates the diaphragm blades is provided with the engaging section 13a that engages said stopping pin 10b and the connecting section 13b which laterally protrudes along the shifting direction and is installed in said lens barrel 1 so as to be rotatable around the optical axis T. The aperture control ring 13, constitutes the stopping part which closes the diaphragm blades to a desired aperture value which is preset by the aperture setting ring 8, by way of said diaphragm interlocking part 5 and the blade closing ring 4 when the shutter pushbutton, which is not indicated in the drawing, is released.

The photo-taking lens 7, aperture setting ring 8, diaphragm cam ring 9, limiting lever 10, shaft 11, spring 12, and the aperture control ring 13 are so arranged as to shift in a definite direction (X direction) in parallel to the said film plane. The blade closing ring 4 is installed on said lens barrel 1 in such a way as to be rotatable around the optical axis T, which forms the operating section 4b that has a notch 4a which engages the connecting section 13b of the said aperture control ring 13, and the linking lever 4c which engages the diaphragm interlocking part 5 which is linked with the shutter pushbutton, of said camera body 6, respectively, and is energized in counterclockwise direction by a spring 14. The connecting section 13b is so constructed as to slide within notch 4a with the parallel shift of the parallel shifting section as well as to hold the engagement of both at all times.

Moreover, said connecting section 13b is so constructed that, when the shutter pushbutton is released, the aperture control ring 13 operates to a position, to which the said limiting lever 10 has been set, via the engagement between the diaphragm closing ring 4 and operating section 4b and the connecting section 13b, and to close down the diaphragm blades to the specified aperture value.

With such a construction, when doing a normal photographing, the lens is set to a position, at which the amount of shift is zero, by operating the operating knob 2 and said aperture ring 8 is set at a desired aperture value by rotating it in the direction of arrow. Then the limiting lever 10 is set at a specified angular position and the stop pin 10b is also set at a specified position by way of the connecting section 8b, projected section 9a, diaphragm cam ring 9, and contacting rod 10a. When the shutter pushbutton is released and the diaghragm interlocking member 5 is moved upwardly, the blade closing ring 4 is rotated in the direction of arrow by the action of the spring 14 and the aperture control ring 13 is rotated in the direction of arrow.

When the aperture control ring 13 is stopped by the engagement of the engaging section 13a and the stop pin 10, the diaphragm blades are closed down to a specified aperture value. After operation of the shutter, the ring 4 is returned by the member 5 against the spring 14 in its initial position to fully open the diaphragm.

Next, when doing shifting photography, rotate the shift operating knob 2 to shift the taking lens 7 through the aperture control ring 13 in X direction by the specified amount. In this case, the contacting section 13b slides within the notch 4a, and the engagement between the contacting section 13b and the operating section 4b is held without the rotation of the ring 4. When the aperture ring 8 is set at a desired aperture value and the shutter pushbutton, is released, automatic stopping - down is performed similar to the above. In the above-mentioned embodiment, the diaphragm interlocking part 5 and the aperture control ring 13 were interlocked by way of the blade closing ring 4. However, the diaphragm interlocking part 5 and the aperture control ring 13 can of course be interlocked directly by energizing the aperture control ring 13 with a spring, etc. Although the contacting section 13b is provided on the aperture control ring 13 projected along the shift direction, it is of course permitted to provide a contacting section protruding along the shift direction either on the blade closing ring 4 or on the diaphragm interlocking part 5. And the engaging relationship between the contacting section 13b and the notch 4 can naturally be reversed. Although the diaphragm cam ring 9, limiting lever 10 etc. were arranged in the aperture setting part and the aperture control ring 13 was formed as the stopping-down part, respectively, it is of course possible to form the stopping-down part with diaphragm cam ring 9, limiting lever 10 etc. and the aperture setting part with the aperture control ring 13.

Next, the second embodiment will be described in detail referring to FIG. 3. The second embodiment is of the type capable of shifting in all directions.

In FIG. 3, 7 is a phototaking lens; 8 is an aperture ring 8a is a notch, 8b is a contacting part, 10 is a limiting lever, 10a is a contacting rod, 10b is a stop pin, 11 is a shaft, 12 is a spring, 13 is an aperture control ring, 13a is an engaging section, and 13b is a contacting section. The above-mentioned parts are arranged in the same manner as in the first embodiment, respectively. A stop-down rotary ring 20 has grooves 20a on the circumference and equally separated from each other and forms the operating section 20c which has the notch 20b engaging the contacting section 13b of said aperture control ring 13.

Said contacting section 13b is so formed as to slide within the notch 20b with the parallel movement of the parallel moving section and to hold the engagement of both all the time. Said stop-down rotary ring 20 is provided on said lens barrel 1 in such a way as to rotate around the optical axis T together with the photo-taking lens 7 through the aperture control ring 13. A stop-down interlocking lever 21 is supported by the shaft 21b installed on the fixed section which does not move in the direction of shifting, and which forms a linking piece 21a engaging the diaphragm interlocking part 5 which is interlocked with the shutter pushbutton. Moreover, a leaf spring 22 which engages the groove section 20a of said stop-down rotary ring 20 is fixed on said stop-down interlocking lever 21 which is energized in counterclockwise direction by a spring 23. The stop-down interlocking lever 21 is interlocked with said stop-down rotary ring 20 by way of the leaf spring 22. A release lever 24 having the middle section rotatably supported by the fixed section which does not move in the shift direction. The hook 24a formed at one end is in contact with said leaf spring 22. Said release lever 24 is so constructed as to release the engagement between the leaf lever 22 and the groove section 20a by rotating said release lever 24 in the direction of arrow. And said leaf lever 22 forms a clutch part with the release lever 24.

With such a construction as has been described, when doing a normal photography, the lens is set at a position at which the shifting amount is zero by operating the shift operating knob 2, and said aperture ring 8 is rotated in the direction of arrow until the desired aperture value is reached. Then the limiting lever 10 is set at specified rotating position by way of the contacting section 8b, protruding section 9a, diaphragm cam ring 9, contacting rod 10a and accordingly the stop pin 10b is also set at specified positions. In this case, when the not-shown shutter pushbutton is released, the stop-down interlocking lever 21 rotates in the direction of arrow by the energizing force of the spring 23 and the stop-down rotary ring 20 rotates in the direction of arrow by way of the engagement between the leaf lever 22 and the groove section 20a and further the aperture control ring 13 rotates in the direction of arrow by way of the engagement between the operating section 20c and the contacting section 13b and, when the aperture control ring 13 is stopped by the engegement of the engeging section 13a with the stop pin 10b, the diaphragm blades are closed down to the specified aperture value.

Next, when doing shifting photography, the engagement between the leaf spring 22 and the groove section 20a is released by rotating the release lever 24 in the direction of arrow, the objective lens 7 is rotated and set through the aperture control ring 13 and the stop-down rotary ring 20 to a desired rotating position, and then the release lever 24 is rotated clockwise again to engage the leaf spring 22 with the groove section 20a.

Thus the direction of shift has been determined. Since a good number of groove sections 20a are provided on the circumference of the stop-down rotary ring 20, the shift direction is not limited to one but can be selected in many directions. After specifying the shift direction as mentioned above, move the objective lens 7 through the aperture control ring 13 in the said shift direction by the specified amount. Then the contacting section 13b slides within the notch 20b. However, since the engagement between the contacting section 13b and the operating section 20c remains held, automatic stopping-down is possible as before when the aperture ring 8 is set to a desired aperture value and the shutter pushbutton is released.

In the second embodiment, the contacting section 13b is formed on the aperture control ring 13. But it is of course possible to form the contacting section on either of the aperture control ring diaphragm cam ring, etc. as long as it controls stopping-down operation. It is also possible to provide the operating section on the part which controls the stopping-down operation, and a contacting section protruding along the direction of shift on the stop-down rotary ring. Further, it is of course possible to directly interlock the stop-down rotary ring 20 with the diaphragm interlocking part 5 and to engage and disengage the interlocking by the clutch part by energizing the aperture control ring 13 in the stopping-down direction by spring etc. and by making the contacting section 13b and the operating section 20c to only stop the rotation of the aperture control ring 13.

As have so far been mentioned, according to this invention automatic stopping-down is possible even in a camera with shiftable objective lens. Full-open light measurement through the maximum aperture of the objective lens is of course possible by the invention, which is useful in practical applications.

What is claimed is:

1. A pre-set stop device for a laterally shiftable objective used in a single lens reflex camera comprising, in combination,
 a lens mount including a fixed mount mounted on the camera and a shiftable mount having an objective lens therein and supported by said fixed mount to laterally move thereto;
 an aperture control ring rotatably mounted in said shiftable mount and having a plurality of diaphragm blades;
 means including an actuating ring rotatably mounted in said fixed mount for actuating the blades of a diaphragm means;
 coupling means for interconnecting said aperture control ring and said actuating ring including a first lug axially extending from said actuating ring and having a groove on its one end and a second lug laterally projecting on the periphery of said control ring and inserted into said groove so as to move laterally therein in accordance with the movement of said shiftable mount;
 preselector ring means rotatably mounted in said shiftable mount and adapted for preselecting the desired aperture in said diaphragm means;
 spring means to rotate said actuating ring to a position to effect adjustment of said aperture in accordance with a preselected aperture when the shutter of the camera is released;
 means to prevent variation of said aperture after said spring means rotates said actuating ring with said control ring to said position.

2. A pre-set stop device according to claim 1, wherein said diaphragm actuating means further includes an actuating lever pivotally mounted in said fixed mount and operable in response to the shutter releasing operation,
 and clutch means provided between said actuating ring and said actuating lever to cause an angular displacement between said actuating ring and said actuating lever when said shiftable mount is optionally rotated.

3. A pre-set stop device according to claim 2, wherein said clutch means includes a plurality of notches formed on said actuating ring, a leaf spring engageable with said notch and having one end mounted on said actuating lever, and operating member engageable to the other end of said leaf spring to disengage said leaf spring from said notch.

* * * * *